April 29, 1969     P. G. SALGADO     3,441,451

HIGH TEMPERATURE STRESS FREE THERMOCOUPLE JUNCTION

Filed Oct. 31, 1966

INVENTOR.
Peter G. Salgado
BY

United States Patent Office 3,441,451
Patented Apr. 29, 1969

3,441,451
HIGH TEMPERATURE STRESS FREE THERMOCOUPLE JUNCTION
Peter G. Salgado, White Rock, Los Alamos, N. Mex., assignor to the United States of America as represented by the United States Atomic Energy Commission
Filed Oct. 31, 1966, Ser. No. 591,011
Int. Cl. H01v 1/04
U.S. Cl. 136—232                                          4 Claims

ABSTRACT OF THE DISCLOSURE

A thermocouple having the thermocouple junction enclosed in a sealed housing and the wires attached to a slidable bridge within the housing, the wires gripped by the bridge and also fused thereto, thereby enabling the thermocouple to withstand high temperatures and high stresses.

---

The invention described herein was made in the course of, or under, Contract W-7405-Eng-36 with the U.S. Atomic Energy Commission.

This invention relates to thermocouples, and more specifically it relates to an improved construction of thermocouple unit and method of making the same.

It is the primary object of this invention to provide a thermocouple having an improved duration of useful life.

Another object is to provide a thermocouple which is relatively immune to the effects of vibration and mechanical or thermal stresses.

Another object is to provide a thermocouple which has the foregoing advantages and in addition is simple in construction and inexpensive to fabricate.

Other objects and advantages will become apparent from the following description and accompanying drawing in which.

The thermocouple of the present invention comprises an assembly in which the thermocouple wires are enclosed in a metallic sheath in which they are insulated from each other and are joined to a housing in which the junction portion of the wires is slidably supported. When fine wires are used, such as in thermocouples designed for fast response, the ends are usually welded to a plug member as shown for example in Patent 3,048,641 to Erlebacher, issued Aug. 7, 1962. However, the heating of the end portions of the wires during welding causes embrittlement with the result that stresses encountered in use, such as expansion and contraction, causes breakage. To the end that this effect can be avoided, the present invention provides a slidably supported bridge member through which the thermocouple wires pass and are welded at the ends. At the wire entry end of the bridge the material of the bridge is compressed to effect a squeeze fit with the wires to give additional support to the junction portion. The slidable bridge provides solid support for the wires and eliminates the mechanical stresses at the embrittled wire ends which arise from thermal effects and vibration.

The invention is of particular significance to small thermocouples such as are inserted in nuclear reactor engines designed for space propulsion. For example, one type of thermocouple successfully used for the purpose, has a niobium sheath having an outside diameter of ¼ inch. The inside diameter is 0.190 inch and the outside diameter of the slidable support bridge is 0.180 inch. The bore holes or apertures through the bridge for the thermocouple wires are of 0.022 inch diameter originally and are spaced 0.036 inch apart on a diameter. The thermocouple wires are $W_5Re$ and $W_{26}Re$, 25 gauge (0.20″ dia.). This thermocouple will sustain temperatures in excess of 4000° F.

Figure 1:
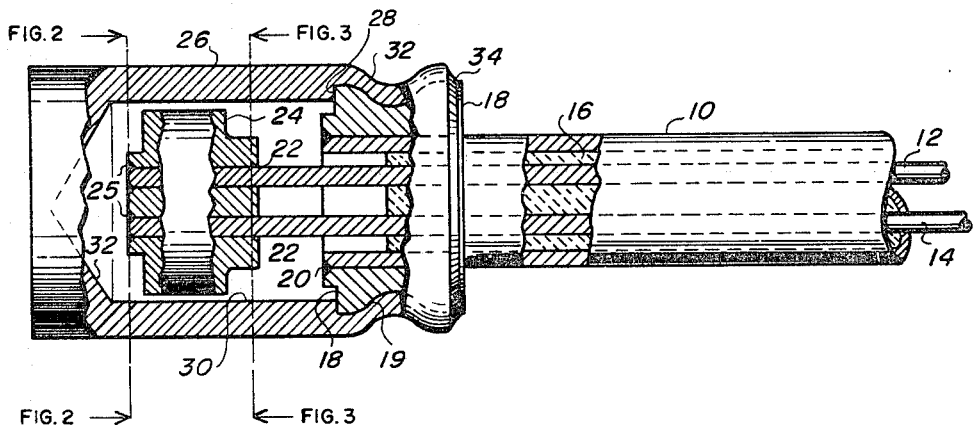
FIGURE 1 is a longitudinal top plan view partly in section, greatly enlarged, of the improved thermocouple of the present invention.
Figure 2:
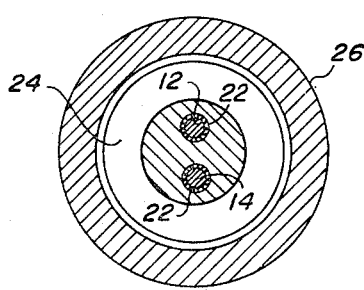
FIGURE 2 is a diametric cross section on plan 2—2 of FIGURE 1.
Figure 3:
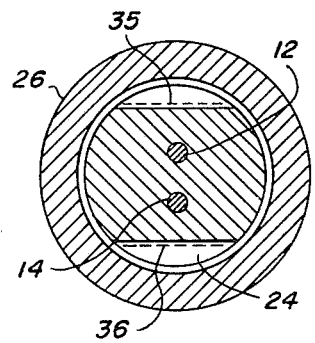
FIGURE 3 is a diametric cross section on plane 3—3 of FIGURE 1.

Turning now to FIGURES 1, 2 and 3 of the drawing, there is shown by way of practicable example, a metallic sheath 10 of any suitable metal such as niobium which contains two thermocouple wires 12 and 14. The wires are insulatedly separated from each other and the sheath by a refractory material 16 such as beryllia. Surrounding the end of the sheath is a metallic cylinder 18 having an interior diameter slightly larger than the external diameter of the sheath and a concave recess 19 in its exterior surface. Metallic cylinder 18, preferably of niobium metal, is welded to the sheath as shown by reference number 20. The thermocouple leads 12 and 14 extend beyond the end of the sheath and are housed in apertures 22 in bridge member 24 terminating substantially flush with the far end of the bridge. Consistent with the remaining parts being selected of materials capable of sustaining high temperatures without deterioration, bridge 24, for high temperature use, is composed of niobium.

The thermocouple wires 12, 14 are welded at their ends to the face of the niobium bridge as shown at 25. The welding process results in some embrittlement of the thermocouple wires in the vicinity of the weld but deleterious results of the embrittlement are avoided by the radial supporting confinement of the wires and the slidable support of the bridge in housing member 26. Housing member 26 is a hollow niobium cup relieved on the interior at the open end for a distance slightly less than the length of metallic cylinder 18. The relieved portion provides an interior shoulder 28. The interior diameter of barrel portion 30 of the housing member is slightly less than the diameter of cylinder 18, with the relieved portion having a diameter such as to give a snug fit over the exterior surface of member 18. Housing member 26 is telescoped over cylinder 18 until the interior shoulder butts against the end of cylinder 18 thus squaring the housing member with the sheath and wire assembly. When the housing is fully seated on cylinder 18, the metal of the relieved portion of the housing is firmly affixed to the exterior recessed portion of cylinder 18 by a deforming operation which compresses the metal of the housing at 32 into the cylinder 18 recess. To hermetically seal and further rigidly affix the housing to member 18, the end of housing member 26 is welded to the exterior surface of cylinder 18 as shown by reference numeral 34. The housing member cavity is longer than the thermocouple wire and sliding bridge assembly so that clearance is provided between the end of the bridge assembly 24 and the interior end 32 of housing member 26.

Referring now to FIGURE 2, bridge member 24 is shown on a diametric cross section on plane 2—2 of FIGURE 1. The thermocouple wires 12 and 14 are supported in bridge member 24 which has a reduced cylindrical end portion to facilitate the operation of fusion to the wires. Additional weld metal is not added when the bridge is of niobium and the thermocouple wires are tungsten-rhenium in composition. The clearance between the bridge member 24 and the cup 26 is shown enlarged for purposes of clarity but in practice the clearance is preferably about one one-hundredth of an inch.

The opposite end of the bridge at plane 3—3 of FIGURE 1 is shown in FIGURE 3. Again the bridge member end is reduced and relieved to produce two flats 35 and 36 lying in parallel planes parallel to the diameter upon which the wire support apertures are located. After the thermocouple wires are in place, pressure is applied to the flats, shown by dotted lines, to compress the metal into a snug fit with the wires. During the compression operation, the arcuate surfaces of the reduced portion are supported against expansion. It has been found that a compression inward of approximately one-thousandth of an inch of each of the flats into the position shown by the solid lines is adequate to firmly grip the thermocouple wires without extrusion effects.

While a particular embodiment of the invention has been shown, it will be understood that many modifications may be made and that the invention will be considered limited only by the appended claims.

What is claimed is:

1. A thermocouple comprising a sheath, a plurality of thermocouple wires insulatedly supported in said sheath and protruding from the end thereof, a cup-shaped housing member, and a sliding bridge member, means affixing said housing member to said sheath at the end thereof, said sliding bridge member filling only a portion of said housing and being slidably supported inside said housing, support means in said bridge member for supporting said thermocouple wires, said wires being fused to the bridge member on the end of the bridge member facing the closed end of the housing member, and said wires being snugly gripped by the bridge member at the end of the bridge member facing the sheath end.

2. The combination in accordance with claim 1 characterized in that the means affixing the housing member to said sheath is a cylindrical member supported on and surrounding the end of the sheath and being hermetically fused thereonto, said cylindrical member having an exterior circumferential recessed portion, and the material of said housing member being compressed into and fitting into the recessed portion of the cylindrical member.

3. The combination of claim 2, further characterized in that the housing member at the end thereof is hermetically fused to the cylindrical member surrounding the sheath.

4. A thermocouple comprising a sheath, a plurality of thermocouple wires insulatedly supported in said sheath and protruding from the end thereof, a housing and a metallic bridge member, said housing being cup-shaped and elongated, means affixing said housing in co-linearly alignment to the end of said sheath, said metallic bridge member filling only a portion of said housing and being slidably supported in said housing member with a non-binding fit therewith, said bridge member having apertures therethrough co-linearly with each of the thermocouple wires, said thermocouple wires threading said bridge apertures and extending to the far face of the bridge member when the bridge member is located intermediate the ends of said housing, means fusing the ends of the thermocouple wires and the bridge member together and the material of the bridge member in an end portion facing the sheath tightly confining the thermocouple wires in their respective apertures.

References Cited
UNITED STATES PATENTS

| | | | |
|---|---|---|---|
| 2,258,809 | 10/1941 | Rabezzana | 136—221 |
| 2,517,033 | 8/1950 | Russell | 136—229 |
| 2,517,053 | 8/1950 | Thompson | 136—233 |
| 2,948,766 | 8/1960 | Schneider et al. | 136—232 |

ALLEN B. CURTIS, *Primary Examiner.*

M. J. ANDREWS, *Assistant Examiner.*